(12) United States Patent
Arora et al.

(10) Patent No.: US 11,907,094 B2
(45) Date of Patent: Feb. 20, 2024

(54) SYSTEM AND METHOD FOR AUTOMATICALLY IDENTIFYING AN ANOMALOUS PATTERN

(71) Applicant: Flipkart Internet Private Limited, Bengaluru (IN)

(72) Inventors: Richa Arora, Bangalore (IN); Priyanshu Raj, Bangalore (IN); Srinivas Deshpande, Bangalore (IN); Ananda Matthur, Bangalore (IN); Roshan Nair, Mumbai (IN); Sasikanth Lenka, Bengaluru (IN); Praveen R S, Thiruvananthapuram (IN)

(73) Assignee: Flipkart Internet Private Limited, Bengaluru (IN)

( * ) Notice: Subject to any disclaimer, the term of this patent is extended or adjusted under 35 U.S.C. 154(b) by 23 days.

(21) Appl. No.: 17/868,407

(22) Filed: Jul. 19, 2022

(65) Prior Publication Data

US 2023/0028223 A1 Jan. 26, 2023

(30) Foreign Application Priority Data

Jul. 20, 2021 (IN) .............................. 202141032699

(51) Int. Cl.
*G06F 11/34* (2006.01)
*G06Q 20/40* (2012.01)

(52) U.S. Cl.
CPC ......... *G06F 11/34* (2013.01); *G06Q 20/4016* (2013.01)

(58) Field of Classification Search
None
See application file for complete search history.

(56) References Cited

U.S. PATENT DOCUMENTS

| 2017/0257450 A1* | 9/2017 | Rao | H02J 13/00028 |
| 2021/0073819 A1* | 3/2021 | Hernandez | G06Q 20/4016 |

* cited by examiner

*Primary Examiner* — Scott C Sun
(74) *Attorney, Agent, or Firm* — Wilmer Cutler Pickering Hale and Dorr LLP

(57) ABSTRACT

A system and method for automatically identifying an anomalous pattern. The method encompasses receiving, a stream of data. The method further comprises determining, a monitoring metric for at least one of one or more dimensions and one or more groups of dimensions associated with the stream of data, at a target time and at a benchmark time period. Further the method comprises identifying, the monitoring metric at the target time as an outlier to the monitoring metric at the benchmark time period based at least on a threshold value. The method further comprises automatically identifying, the anomalous pattern based at least on said identification of the monitoring metric for at least one of the dimension(s) and the group(s) of dimensions at the target time as the outlier to the monitoring metric for at least one of the dimension(s) and the group(s) of dimensions at the benchmark time period.

18 Claims, 2 Drawing Sheets

SYSTEM AND METHOD FOR AUTOMATICALLY IDENTIFYING AN ANOMALOUS PATTERN

CROSS-REFERENCE TO RELATED APPLICATIONS

The present application claims priority to Indian Patent Application No.: 202141032699; entitled "SYSTEM AND METHOD FOR AUTOMATICALLY IDENTIFYING AN ANOMALOUS PATTERN," filed Jul. 20, 2021, the disclosure of which is hereby incorporated by reference herein its entirety.

TECHNICAL FIELD

The present invention generally relates to fraud detection and more particularly to systems and methods for automatically identifying one or more anomalous patterns in an input data stream to detect digital fraud(s).

BACKGROUND OF THE DISCLOSURE

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

With an immense growth in the field of digital technologies, a number of facilities are provided to users of electronic devices. For instance various digital platforms such as e-commerce platforms, mobile commerce platforms, social media platforms etc. provides the users at least the facilities to buy various products, complete various digital transactions and communicate over various communications means, respectively.

Also, with the increase in the digital facilities, digital frauds are increased to a great extent. In an e-commerce environment, digital frauds such as frauds related to purchase of product(s), payment of product(s), refund of product(s), return of product(s) and the like are increasing at a rapid rate. The digital frauds can be done by creating a false identity, by providing a false address, by using fake or stolen payment details, by creating multiple purchasing orders for limited products, by returning a false product, by raising false customer complaints and by various other means. Therefore, there is a requirement to detect and prevent such digital frauds.

In order to detect the digital frauds a number of solutions are developed over a period of time. For instance, some of the existing solutions largely rely on humans to detect if a fraud has occurred for a first time to create rules/models for automatic detection of further incidents of the same fraud pattern. Some of the other known solutions provides various methods to detect or 'tag' an entity or a person as possibly fraudulent based on their association with other entities. The currently known solutions fails to detect the digital frauds without human intervention. Currently there is no solution that can detect digital frauds automatically by detecting anomalous pattern in digital data such as including but not limited to e-commerce data. Also, the currently the fraud detection solutions are not efficient at least due to their dependency on previous knowledge of digital frauds. Therefore, there is a need in the art to provide a solution to automatically identify one or more anomalous patterns in a digital data to detect digital fraud(s).

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present invention is to provide a method and system for automatically identifying one or more anomalous patterns to further identify digital fraud(s). Another object of the present invention is to determine if a fraud/digital fraud has occurred by going through anomalous patterns in e-commerce data. Also an object of the present invention is to provide a fraud detection method and system that can detect digital frauds without the any previous knowledge of such digital frauds. Another object of the present invention is to reduce the human efforts in detecting digital frauds. Further an object of the present invention is to detect fraudulent transactions on ecommerce platforms through identifying anomalous patterns in ecommerce data of such platforms. Another object of the present invention is to enable users of electronic devices and/or ecommerce platforms to define specific metrics, data sources and monitoring time period in a self-serve manner to identify anomalous patterns in digital data. Also, an object of the present invention is to enable end users to define entity cohorts, various logics etc. to detect anomalies in digital data. Another object of the present invention is to flag suspicious fraud(s) related to a digital platforms (such as e-commerce platforms) based on identifying anomalies for a cohort. Yet another object of the present invention is to provide a solution to detect frauds in an e-commerce environment based on a combination of a system for automated detecting anomalies and definition of anomalies which target frauds, specifically in the e-commerce platforms for transactions.

Furthermore, in order to achieve the aforementioned objectives, the present invention provides a method and system for automatically identifying an anomalous pattern.

A first aspect of the present invention relates to the method for automatically identifying an anomalous pattern. The method encompasses receiving, at an input unit, a stream of data. The method further leads to determining, by a processing unit, a monitoring metric for at least one of one or more dimensions and one or more groups of dimensions associated with the stream of data, at a target time. Further the method comprises determining, by the processing unit, the monitoring metric for at least one of the one or more dimensions and the one or more groups of dimensions, at a benchmark time period. Further the method comprises identifying, by an identification unit, the monitoring metric for at least one of the one or more dimensions and the one or more groups of dimensions at the target time as an outlier to the monitoring metric for at least one of the one or more dimensions and the one or more groups of dimensions at the benchmark time period, based at least on an event where the monitoring metric for at least one of the one or more dimensions and the one or more groups of dimensions at the target time is greater than the monitoring metric for at least one of the one or more dimensions and the one or more groups of dimensions at the benchmark time period, at least by a threshold value. The method further comprises automatically identifying, by the identification unit, the anomalous pattern based at least on the identification of the monitoring metric for at least one of the one or more dimensions and the one or more groups of dimensions at the target time as the outlier to the monitoring metric for at least one of the one or more dimensions and the one or more groups of dimensions at the benchmark time period.

Another aspect of the present invention relates to a system for automatically identifying an anomalous pattern. The system further comprises an input unit, configured to receive, a stream of data. Further the system comprises processing unit configured to determine, a monitoring metric for at least one of one or more dimensions and one or more groups of dimensions associated with the stream of data, at a target time. The processing unit is further configured to determine, the monitoring metric for at least one of the one or more dimensions and the one or more groups of dimensions, at a benchmark time period. The identification unit is further configured to identify, the monitoring metric for at least one of the one or more dimensions and the one or more groups of dimensions at the target time as an outlier to the monitoring metric for at least one of the one or more dimensions and the one or more groups of dimensions at the benchmark time period, based at least on an event where the monitoring metric for at least one of the one or more dimensions and the one or more groups of dimensions at the target time is greater than the monitoring metric for at least one of the one or more dimensions and the one or more groups of dimensions at the benchmark time period, at least by a threshold value. Further the identification unit is configured to automatically identify, the anomalous pattern based at least on the identification of the monitoring metric for at least one of the one or more dimensions and the one or more groups of dimensions at the target time as the outlier to the monitoring metric for at least one of the one or more dimensions and the one or more groups of dimensions at the benchmark time period.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1:
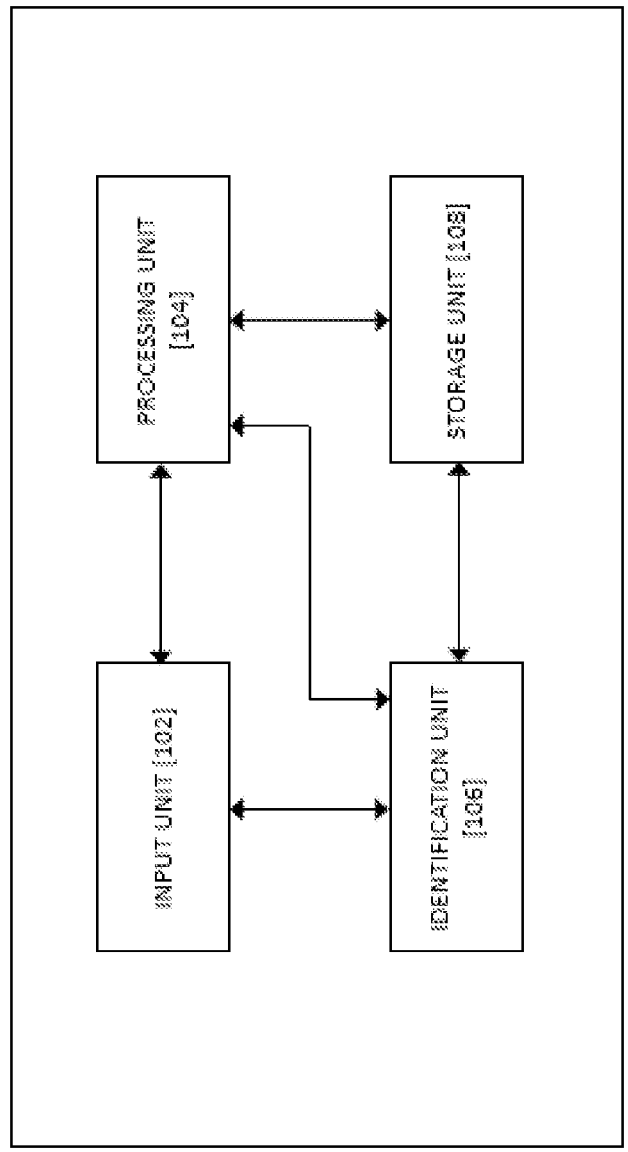
FIG. 1 illustrates an exemplary block diagram of a system [100] for automatically identifying an anomalous pattern, in accordance with exemplary embodiments of the present invention.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only some of the problems discussed above.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, processes, and other components may be shown as components in block diagram form in order not to obscure the embodiments in unnecessary detail.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, a "processing unit" or "processor" or "operating processor" includes one or more processors, wherein processor refers to any logic circuitry for processing instructions. A processor may be a general-purpose processor, a special purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, "a user equipment", "a user device", "a smart-user-device", "a smart-device", "an electronic device", "a mobile device", "a handheld device", "a wireless communication device", "a mobile communication device", "a communication device" may be any electrical, electronic and/or computing device or equipment, capable of implementing the features of the present disclosure. The user equipment/device may include, but is not limited to, a mobile phone, smart phone, laptop, a general-purpose computer, desktop, personal digital assistant, tablet computer, wearable device or any other computing device which is capable of implementing the features of the present disclosure. Also, the user device may contain at least one input means configured to receive an input from a processing unit, an input unit, an identification unit, a storage unit and any other such unit(s) which are required to implement the features of the present disclosure.

As used herein, "storage unit" or "memory unit" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The storage unit stores at least the data that may be required by one or more units of the system to perform their respective functions.

As disclosed in the background section the existing technologies have many limitations and in order to overcome at least some of the limitations of the prior known solutions, the present disclosure provides a solution for automatically identifying an anomalous pattern in an input data stream to detect one or more digital frauds. In an implementation, the present invention provides a solution to determine if a fraud has occurred by going through anomalous patterns identified in an e-commerce data. To detect one or more anomalies in a data stream, the present solution receives the data stream as an input, compares it with a common pattern based on the features of the present invention, and if the given input at any point of time is identified to be deviated from the common pattern, then it outputs it as an anomaly. Further, if the anomaly fits into a pattern of a 'fraud', it is further identified as a 'potentially fraudulent transaction'. More specifically, the present solution identifies if any particular metric at a defined level of hierarchy or dimension is behaving suspiciously to automatically identify anomaly/anomalies, to further take action(s) to mitigate the impact of the anomaly/anomalies. In an implementation the anomalies are defined as events that deviate from a standard, happen rarely, and do not follow a usual pattern.

Furthermore, for comparing the input data stream with the common pattern(s) based on the features of the present invention, the present invention enables users to define specific metrics, data sources and monitoring time period in a self-serve manner. It also enables exclusion criteria to be set where relevant. Also, the present invention enables the end users to define entity cohorts and logic(s) to detect anomalies. In an implementation the present invention provides a solution that identifies anomalies for a cohort based at least on a dataset and a logic defined for such dataset. These anomalies are then flagged as suspicious fraud. Therefore, the present invention provides a solution to narrow a search space for potential digital frauds, thereby detecting frauds much faster than existing methods.

Hereinafter, exemplary embodiments of the present disclosure will be described in detail with reference to the accompanying drawings so that those skilled in the art can easily carry out the present disclosure.

Referring to FIG. 1, an exemplary block diagram of a system [100] for automatically identifying an anomalous pattern is shown. The system [100] comprises at least one input unit [102], at least one processing unit [104], at least one identification unit [106] and at least one storage unit [108]. Also, all of the components/units of the system [100] are assumed to be connected to each other unless otherwise indicated below. Also, in FIG. 1 only a few units are shown, however, the system [100] may comprise multiple such units or the system [100] may comprise any such numbers of said units, as required to implement the features of the present disclosure. Further, in an implementation, the system [100] may be present in a server device to implement the features of the present invention.

The system [100] is configured to automatically identify an anomalous pattern, with the help of the interconnection between the components/units of the system [100].

In order to implement the features of the present invention, the processing unit [104] is configured to define a monitoring metric. In an implementation the monitoring metric may be either an average, count, moving average, standard deviation or the like.

Also, the processing unit [104] is configured to determine a dataset based on at least one cohort, wherein each cohort from the at least one cohort comprises one or more input dimensions. In an implementation in an e-commerce environment, the dataset may include but not limited to customer returns, account IDs of customers, products ordered, time of orders and the like. Further, in an example if in an e-commerce environment, a cohort comprises a category of a product such as 'Mobile' as an input dimension, in the given instance the processing unit [102] may be configured to determine a dataset comprising customer returns related to mobile(s), account IDs of customers buying mobile(s), mobile(s) ordered and/or the like data.

Also, the monitoring metric is defined and monitored by the processing unit [104] based on the dataset. For instance, if in an e-commerce environment, a dataset is associated with one or more return requests, in such instance the processing unit [104] may be configured to define a monitoring metric for count of the return requested.

Further, in order to automatically identify an anomalous pattern to detect one or more digital frauds in an input data, the input unit [102] is configured to receive, a stream of data as the input data.

Thereafter, the processing unit [104] is configured to determine, the monitoring metric for at least one of one or more dimensions and one or more groups of dimensions associated with the stream of data, at a target time. The one or more dimensions and the one or more groups of dimensions are identified based on the dataset. For example, if a monitoring metric is defined based on a dataset, wherein said dataset is determined based on an input dimension "customer segment" of a cohort associated an e-commerce platform. Also, if a stream of data during a sale event is received. The processing unit [104] in such event may be configured to determine a dimension associated with said stream of data received during the sale event, wherein said dimension is determined based on the dataset determined based on an input dimension "customer segment". Further, once the dimension associated with the stream of data is determined, the processing unit [104] is configured to determine the monitoring metric, at a particular day of the sale event (i.e. at the target time), for said dimension associated with said stream of data received during the sale event.

Further the processing unit [104] is configured to determine, the monitoring metric for at least one of the one or more dimensions and the one or more groups of dimensions, at a benchmark time period. Considering the above example where a monitoring metric is determined by the processing unit [104] for a dimension associated with a stream of data received during a sale event, at a particular day of the sale event (i.e. at the target time). If the sale event in the given example is 10 days sale event and the particular day is last day of sale event, the processing unit [104] is also configured to determine the monitoring metric for the dimension associated with the stream of data received during the sale event, at past 9 days of the sale event (i.e. at the benchmark time period).

Further, the identification unit [106] is configured to identify, the monitoring metric for at least one of the one or more dimensions and the one or more groups of dimensions at the target time as an outlier to the monitoring metric for at least one of the one or more dimensions and the one or more groups of dimensions at the benchmark time period, based at least on an event where the monitoring metric for at least one of the one or more dimensions and the one or more groups of dimensions at the target time is greater than the monitoring metric for at least one of the one or more dimensions and the one or more groups of dimensions at the benchmark time period, at least by a threshold value. In an implementation the threshold value is 75 percentile. Also, in the given implementation the identification of the monitoring metric for at least one of the one or more dimensions and the one or more groups of dimensions at the target time as the outlier to the monitoring metric for at least one of the one or more dimensions and the one or more groups of dimensions at the benchmark time period, is further based on an interquartile range (IQR) formula. For instance, if a monitoring metric 'Md' for at least one of the one or more dimensions and the one or more groups of dimensions at a target time 't0' is 'Md@t0' and the monitoring metric 'Md' for at least one of the one or more dimensions and the one or more groups of dimensions at a benchmark time period 't1, . . . , tn' is 'Md@t1, . . . tn', the monitoring metric 'Md@t0' is identified as an outlier to the monitoring metric 'Md@t1, . . . tn' based on:

$$Md@t0 > perc75(Md@t1, \quad . \quad . \quad . \quad tn) + k1*\{IQR(Md@t1, \ldots, tn)\}$$

Where, d is one of the one or more dimensions and the one or more groups of dimensions, perc75 is the threshold value, k1 is the constant and IQR indicates the interquartile range formula.

Further the identification unit [106] is configured to automatically identify, the anomalous pattern based at least on the identification of the monitoring metric for at least one of the one or more dimensions and the one or more groups of dimensions at the target time as the outlier to the monitoring metric for at least one of the one or more dimensions and the one or more groups of dimensions at the benchmark time period. Considering the above example where the monitoring metric 'Md@t0' is identified as the outlier to the monitoring metric 'Md@t1, . . . tn', the identification unit [106] based on the identification of the 'Md@t0' as the outlier to the monitoring metric 'Md@t1, . . . tn' automatically identifies a user pattern associated with the monitoring metric 'Md@t0' (i.e. the monitoring metric 'Md' for at least one of the one or more dimensions and the one or more groups of dimensions associated with the input data stream, at a target time 't0') as an anomalous pattern.

The processing unit [104] is further configured to determine, a first ratio based on an iterative comparison of the monitoring metric for at least one of the one or more dimensions and the one or more groups of dimensions determined at the target time with an average of the monitoring metric for at least one of the one or more dimensions and the one or more groups of dimensions determined at the benchmark time period. Considering the above example, the processing unit [106] is configured to determine the first ratio (ratio_d) for one iteration as:

$$ratio\_d = Md@t0/\mathrm{mean}(Md@t1, \ldots tn)$$

Also, the processing unit [104] is configured to determine at the target time, the monitoring metric for at least one of: one dimension above the one or more dimensions associated with the stream of data received as the input data; and one dimension above the one or more groups of dimensions associated with the stream of data received as the input data. In an event, if there is a single dimension associated with the stream of data received as the input data, in the given event the one dimension above this single dimension may be the entire stream of data/input data. Therefore, the event where the processing unit [104] is configured to determine, the monitoring metric for the one dimension above the single dimension associated with the stream of data received as the input data, in such event the processing unit [104] is configured to determine, the monitoring metric for the entire stream of data received as the input data. Further the processing unit [104] is configured to determine, at the benchmark time period, the monitoring metric for at least one of: the one dimension above the one or more dimensions associated with the stream of data received as the input data; and the one dimension above the one or more groups of dimensions associated with the stream of data received as the input data. Once the monitoring metric for at least one of: the one dimension above the one or more dimensions; and the one dimension above the one or more groups of dimensions at the target time and the benchmark time period is determined, the processing unit [104] is thereafter configured to compare iteratively, the monitoring metric for the at least one of: the one dimension above the one or more dimensions; and the one dimension above the one or more groups of dimensions at the target time, with an average of the monitoring metric for the at least one of: the one dimension above the one or more dimensions; and the one dimension above the one or more groups of dimensions at the benchmark time period. Further the processing unit [104] is configured to determine, a second ratio based on said iterative comparison. For example, for one iteration the processing unit [104] is configured to determine the second ratio (ratio_d_1) as:

$$ratio\_d\_1 = Md\_1@t0/\mathrm{mean}(Md\_1@t1, \ldots tn)$$

where, d–1 is one of: the one dimension above the one or more dimensions; and the one dimension above the one or more groups of dimensions, Md_1 is metric for d–1, t0 is the target time, t1, . . . tn is the benchmark time period.

Furthermore, the automatic identification of the anomalous pattern is further based on a comparison of the first ratio and the second ratio. More particularly, if the first ratio is identified to be greater than the second ratio, the identification unit [106] is configured to automatically identify, a user pattern associated with the monitoring metric determined at the target time, for at least one of the one or more dimensions and the one or more groups of dimensions associated with the stream of data i.e. the input data stream, as an anomalous pattern. Considering the above instances where the first ratio is determined as ratio_d and the second ratio is determined as ratio_d_1, the identification unit [106] in the given scenario is configured to identify the user pattern associated with the monitoring metric determined at the target time, for at least one of the one or more dimensions and the one or more groups of dimensions associated with the stream of data, as the anomalous pattern based on the following condition:

$$ratio\_d > k2 * ratio\_d\_1$$

where k2 is the constant.

Furthermore, an example is provided below for one iteration, to automatically identify one or more anomalies based on a detection of a spike in return creation for a vertical and a customer profile level (i.e. for two dimensions—the vertical and the customer profile) associated with an input data, based on the implementation of the features of the present invention. In an implementation the vertical may be a category of product and the customer profile may be a customer segment. Also, the spike in returns creation may be due to fraud attack. It is highly unlikely to observe a spike at an overall level (such as at the entire input data level or collectively for all dimensions). But usually the spike is concentrated in a particular cohort and hence there is a need to check the spike at different dimensions and combination of dimensions. Further, in the given example to automatically identify the spike the following are considered:

For the 'Vertical' & the 'Customer profile' dimensions (i.e. for a group (d) of two dimensions Vertical and Customer profile)
  Metric at t0, t1, ..., tn: count of return requested at t0, t1, ..., tn (i.e. a monitoring metric such as a count of returns requested (i.e. number of orders for which a return request has been placed by the users of the digital platform) is defined by the processing unit [104] at a target time i.e. t0 and at a benchmark time i.e. t1, ..., tn)
  Metric at 'd' denoted as Md
  ratio_d=Md@t0/mean(Md @ t1, ..., tn) (i.e. the first ratio is determined by the processing unit [106] based on a comparison of the monitoring metric for 'd' at target time 't0' i.e. Md@t0 with mean of the monitoring metric for 'd' at benchmark time 't1, ..., tn' i.e. Md @ t1, ..., tn)
For 'Vertical' (d_1) (i.e. for one dimension above the group (d) of two dimensions 'Vertical' and 'Customer profile')
  Metric at t0, t1, ..., tn: count of return requested at t0, t1, ..., tn (i.e. the monitoring metric of the count of the return requested is defined by the processing unit [104] at the target time i.e. t0 and at the benchmark time i.e. t1, ..., tn)
  Metric at d–1 denoted as Md_1
  ratio_d_1=Md_1@t0/mean(Md_1 @ t1, ..., tn) (i.e. the second ratio is determined by the processing unit [106] based on a comparison of the monitoring metric for 'd–1' at target time 't0' i.e. Md_1@t0 with mean of the monitoring metric for 'd–1' at benchmark time 't1, ..., tn' i.e. Md_1@ t1, ..., tn)
Flag d as anomalous if
  Md@t0>perc75(Md @ t1, ..., tn)+k1*{IQR (Md @t1, ..., tn)} [Checking for outlier]
  AND
  ratio_d>k2*ratio_d_1 (i.e. the processing unit [104] is configured to identify/tag the input data associated with the group of two dimensions i.e. 'd' as the anomalous data/pattern based on an identification of Md as an outlier to the Md@t1, ..., tn and an identification of an event where the first ratio is greater than the second ratio. More particularly, based on the identification of the Md as the outlier to the Md@t1, ..., tn and the identification of the event where the first ratio is greater than the second ratio, a pattern associated with the input data associated with 'd' at the target time is identified to be deviated from a pattern associated with the input data associated with 'd' at the benchmark time period, and therefore said input data identified as the anomalous data/pattern.)

Further, in an implementation the processing unit [104] is also configured to determine, the monitoring metric for each vertical of the cohort at the target time. In an implementation the each vertical may be an input dimension of the cohort such as a category of product. Further the processing unit [104] is configured to determine, the monitoring metric for the each vertical of the cohort at the benchmark time period. Once the monitoring metric for the each vertical of the cohort at the target time and the benchmark time period is determined, the processing unit [104] is thereafter configured to compare, the monitoring metric for the each vertical of the cohort at the target time with an average of the monitoring metric for the each vertical of the cohort at the benchmark time period. Further the processing unit [104] is configured to determine, a third ratio based on said comparison. Also, once the third ratio is determined the identification unit [106] is thereafter configured to automatically identify, the anomalous pattern based on a comparison of the first ratio and the third ratio. More particularly, if the comparison of the first ratio and the third ratio is above a threshold value (such as first ratio/third ratio >1.4), the identification unit [106] in such event is configured to automatically identify the user pattern associated with the monitoring metric determined at the target time, for at least one of the one or more dimensions and the one or more groups of dimensions associated with the stream of data i.e. the input data stream, as the anomalous pattern.

Figure 2:
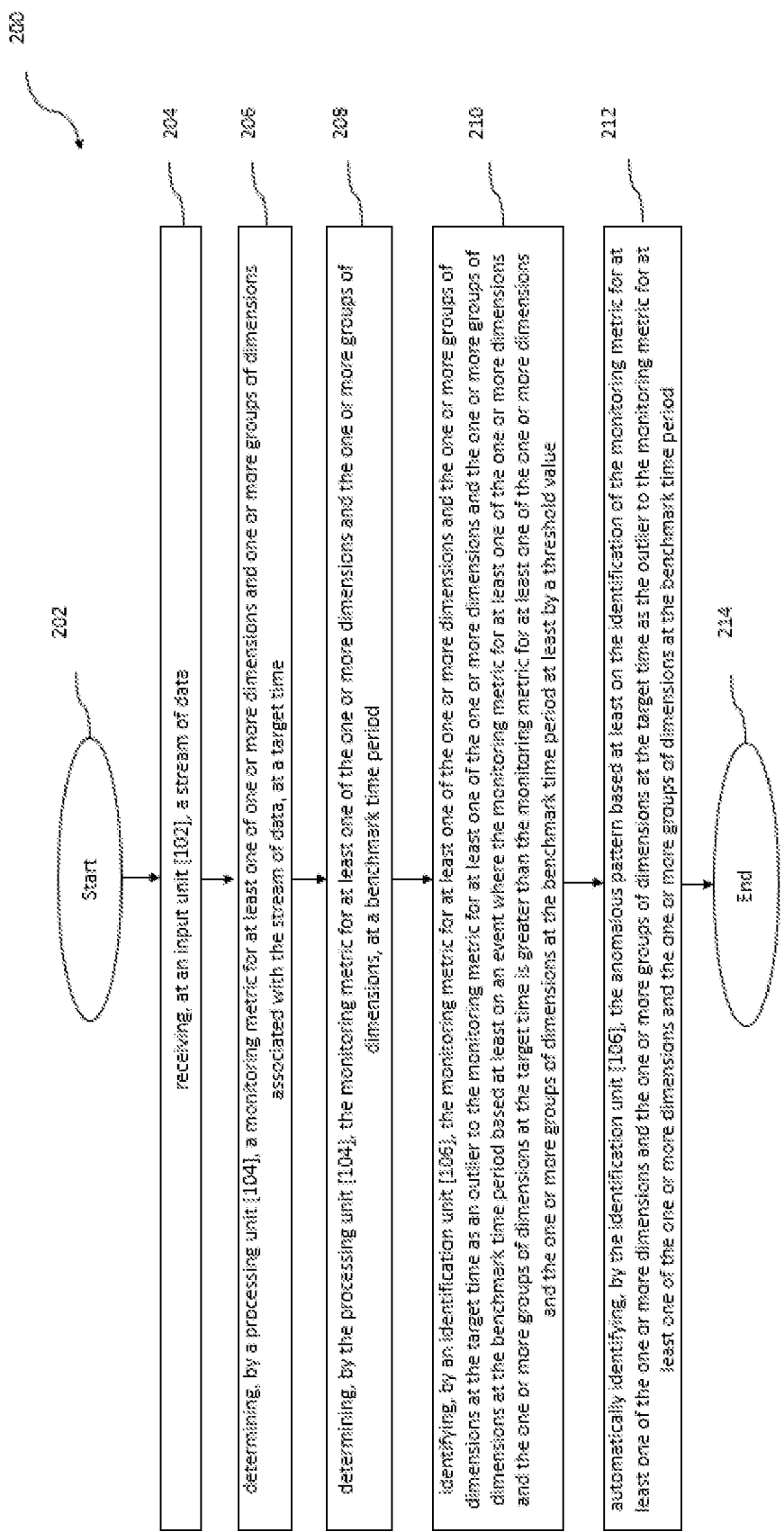
FIG. 2 illustrates an exemplary method flow diagram [200], for automatically identifying an anomalous pattern, in accordance with exemplary embodiments of the present invention.

Referring to FIG. 2 an exemplary method flow diagram [200], for automatically identifying an anomalous pattern, in accordance with exemplary embodiments of the present invention is shown. In an implementation the method is performed by the system [100]. Further, in an implementation, the system [100] may be present in a server device to implement the features of the present invention. Also, as shown in FIG. 2, the method starts at step [202].

In order to implement the features of the present invention, the method encompasses defining by a processing unit [104], a monitoring metric. In an implementation the monitoring metric may be either an average, count, moving average, standard deviation or the like.

Also, the method comprises determining by the processing unit [104], a dataset based on at least one cohort, wherein each cohort from the at least one cohort comprises one or more input dimensions. In an implementation, in an e-commerce environment, the dataset may include but not limited to customer returns, account IDs of customers, products ordered, time of orders, units of orders, order replacement requests, number of transactions and the like. Further, in an example if in an e-commerce environment, a cohort comprises a category of a product such as 'Shirt' as an input dimension, in the given example the method may comprise determining by the processing unit [102] a dataset comprising customer returns related to shirt(s), account IDs of customers buying shirts(s), shirts(s) ordered and/or the like data.

Also, the monitoring metric is defined and monitored by the processing unit [104] based on the dataset. For instance, if in an e-commerce environment, a dataset is associated with one or more order creations, the method in such instance encompasses defining by the processing unit [104], a monitoring metric for count of the orders created.

Further, in order to automatically identify an anomalous pattern to detect one or more digital frauds in an input data, at step [204] the method comprises receiving, at an input unit [102], a stream of data as the input data.

Next at step [206] the method comprises determining, by the processing unit [104], a monitoring metric for at least one of one or more dimensions and one or more groups of dimensions associated with the stream of data, at a target time. In an implementation the target time is the time at which the anomaly is to be reported. The one or more dimensions and the one or more groups of dimensions are identified based on the dataset. For example, if a monitoring metric is defined based on a dataset, wherein said dataset is determined based on an input dimension "category of product" of a cohort associated an e-commerce platform. Also, if a stream of data during a day time is received. The method in such event may comprise determining by the processing unit [104], a dimension associated with said stream of data received during the day time, wherein said dimension is determined based on the dataset determined based on an input dimension "category of product". Further, once the dimension associated with the stream of data is determined, the method comprises determining by the processing unit [104], the monitoring metric, at a particular day time (i.e. at the target time), for said dimension associated with said received stream of data.

Further, at step [208] the method comprises determining, by the processing unit [104], the monitoring metric for at least one of the one or more dimensions and the one or more groups of dimensions, at a benchmark time period. Considering the above example where a monitoring metric is determined by the processing unit [104] for a dimension associated with a stream of data received during a day time, at a particular day time (i.e. at the target time), the method in such event also encompasses determining by the processing unit [104], the monitoring metric for the dimension associated with the stream of data received during the day time, at a time interval prior to the particular day time (i.e. at the benchmark time period). For instance, the particular day time is 7 PM, in an implementation the time interval may be 5 PM to 7 PM.

Next, at step [210] the method comprises identifying, by an identification unit [106], the monitoring metric for at least one of the one or more dimensions and the one or more groups of dimensions at the target time as an outlier to the monitoring metric for at least one of the one or more dimensions and the one or more groups of dimensions at the benchmark time period, based at least on an event where the monitoring metric for at least one of the one or more dimensions and the one or more groups of dimensions at the target time is greater than the monitoring metric for at least one of the one or more dimensions and the one or more groups of dimensions at the benchmark time period, at least by a threshold value. In an implementation the threshold value is 75 percentile. Also, in the given implementation the identification of the monitoring metric for at least one of the one or more dimensions and the one or more groups of dimensions at the target time as the outlier to the monitoring metric for at least one of the one or more dimensions and the one or more groups of dimensions at the benchmark time period, is further based on an interquartile range (IQR) formula. For instance, if a monitoring metric 'Md' for at least one of the one or more dimensions and the one or more groups of dimensions at a target time 't0' is 'Md@t0' and the monitoring metric 'Md' for at least one of the one or more dimensions and the one or more groups of dimensions at a benchmark time period 't1, . . . , tn' is 'Md@t1, . . . , tn', the monitoring metric 'Md@t0' is identified as an outlier to the monitoring metric 'Md@t1, . . . , tn' based on:

$$Md@t0 > \text{perc75}(Md@t1, \ldots, tn) + k1 * \{IQR(Md@t1, \ldots, tn)\}$$

Where, d is one of the one or more dimensions and the one or more groups of dimensions, perc75 is the threshold value, k1 is the constant and IQR indicates the interquartile range formula.

Thereafter, at step [212] the method comprises automatically identifying, by the identification unit [106], the anomalous pattern based at least on the identification of the monitoring metric for at least one of the one or more dimensions and the one or more groups of dimensions at the target time as the outlier to the monitoring metric for at least one of the one or more dimensions and the one or more groups of dimensions at the benchmark time period. Considering the above example where the monitoring metric 'Md@t0' is identified as the outlier to the monitoring metric 'Md@t1, . . . , tn', the method based on the identification of the 'Md@t0' as the outlier to the monitoring metric 'Md@t1, . . . , tn', automatically identifies by the identification unit [106], a user pattern associated with the monitoring metric 'Md@t0' (i.e. the monitoring metric 'Md' for at least one of the one or more dimensions and the one or more groups of dimensions associated with the input stream of data, at a target time 'to') as an anomalous pattern.

The method further comprises determining by the processing unit [104], a first ratio based on an iterative comparison of the monitoring metric for at least one of the one or more dimensions and the one or more groups of dimensions determined at the target time with an average of the monitoring metric for at least one of the one or more dimensions and the one or more groups of dimensions determined at the benchmark time period. Considering the above example, the method comprises determining by the processing unit [106], the first ratio (ratio_d) for a single iteration as:

$$\text{ratio\_d} = Md@t0/\text{mean}(Md@t1, \ldots, tn)$$

The method also comprises determining at the target time, by the processing unit [104], the monitoring metric for at least one of: one dimension above the one or more dimensions associated with the stream of data received as the input data; and one dimension above the one or more groups of dimensions associated with the stream of data received as the input data. In an event, if there is a single dimension associated with the stream of data received as the input data, in the given event the one dimension above this single dimension may be the entire stream of data/input data. Therefore, the event where the method comprises determining the monitoring metric for the one dimension above the single dimension associated with the stream of data, in such event the method encompasses determining by the processing unit [104], the monitoring metric for the entire stream of data received as the input data. Further the method comprises determining by the processing unit [104], at the benchmark time period, the monitoring metric for at least one of: the one dimension above the one or more dimensions associated with the stream of data received as the input data; and the one dimension above the one or more groups of dimensions associated with the stream of data received as the input data. Once the monitoring metric for at least one of: the one dimension above the one or more dimensions; and the one dimension above the one or more groups of dimensions at the target time and the benchmark time period is determined, the method thereafter encompasses comparing iteratively, by the processing unit [104], the monitoring metric for the at least one of: the one dimension above the one or more dimensions; and the one dimension above the one or more groups of dimensions at the target time with an average of the monitoring metric for the at least one of: the one dimension above the one or more dimensions; and the one dimension above the one or more groups of dimensions at the benchmark time period. Further the method comprises determining by the processing unit [104], a second ratio based on said iterative comparison. For example, for one iteration the method determines the second ratio (ratio_d_1) as:

$$ratio\_d\_1 = Md\_1@t0/mean(Md\_1@t1, \ldots, tn)$$

where, d−1 is one of: the one dimension above the one or more dimensions; and the one dimension above the one or more groups of dimensions, Md_1 is metric for d−1, t0 is the target time, t1, . . . , tn is the benchmark time period.

Furthermore, in an implementation the step of automatically identifying, by the identification unit [106], the anomalous pattern is further based on a comparison of the first ratio and the second ratio. More particularly, if the first ratio is identified to be greater than the second ratio, the method encompasses automatically identifying by the identification unit [106], a user pattern associated with the monitoring metric determined at the target time, for at least one of the one or more dimensions and the one or more groups of dimensions associated with the stream of data, as an anomalous pattern. Considering the above instances where the first ratio is determined as ratio_d and the second ratio is determined as ratio_d_1, the method in the given scenario comprises identifying by the identification unit [106], the user pattern associated with the monitoring metric determined at the target time, for at least one of the one or more dimensions and the one or more groups of dimensions associated with the stream of data, as the anomalous pattern based on the following condition:

$$ratio\_d > k2*ratio\_d\_1$$

where k2 is the constant.

Also, in an implementation the method comprises determining, by the processing unit [104], the monitoring metric for each vertical of the cohort at the target time. In an implementation the each vertical may be an input dimension of the cohort such as a category of product. Further the method also encompasses determining, by the processing unit [104], the monitoring metric for the each vertical of the cohort at the benchmark time period. Once the monitoring metric for the each vertical of the cohort at the target time and the benchmark time period is determined, the method thereafter comprises comparing, by the processing unit [104], the monitoring metric for the each vertical of the cohort at the target time with an average of the monitoring metric for the each vertical of the cohort at the benchmark time period. The method thereafter encompasses determining, by the processing unit [104], a third ratio based on said comparison. Also, once the third ratio is determined the method encompasses automatically identifying by the identification unit [106], the anomalous pattern based on a comparison of the first ratio and the third ratio. More particularly, if the comparison of the first ratio and the third ratio is above a threshold value (such as first ratio/third ratio >1.4), the method in such event encompasses automatically identifying by the identification unit [106], the user pattern associated with the monitoring metric determined at the target time, for at least one of the one or more dimensions and the one or more groups of dimensions associated with the stream of data (i.e. the input data stream), as the anomalous pattern.

After identifying one or more anomalous patterns in a digital data (such as an e-commerce data), the method terminates at step [216].

Furthermore, an example is provided below to identify one or more anomalous patterns related order creation for one iteration, where a spike for a combination of dimensions is benchmarked against a spike in vertical level, wherein the spike is calculated as ratio of a metric at a target time t0 and avg of metric at a benchmark time period t1 to tn. The spike in the order creation in the given example is detected by:

Computing moving average of orders in a vertical till 9 AM for the last 10 days
    Computing Vertical Spike Factor (i.e. determining the third ratio based on a comparison of the monitoring metric (i.e. No of orders) for vertical till 9 AM today/Avg of the monitoring metric (i.e. no of orders) for vertical till 9 AM in last 10 days)
Computing moving average of orders in:
    vertical×pincode×is_new_customer×channel (i.e. in multiple dimensions associated with an input data/steam of data)
    Computing Multi Dimension Spike Factor (i.e. determining the first ratio based on a comparison of the monitoring metric (i.e. No of orders) for the multiple dimensions at a target time (i.e. till 9 AM today) with the monitoring metric (i.e. No of orders) for the multiple dimensions at benchmark time (i.e. till 9 AM in last 10 days))
Computing Spike Ratio (multi-dimensional spike/vertical spike i.e. first ratio/third ratio)
Flag/tag as anomalous if
    Spike factor (first ratio/third ratio) is >1.4 (i.e. in an implementation if the spike factor based on the spike ratio i.e. the multi-dimensional spike/vertical spike is identified as greater than 1.4, the input data associated with the multiple dimensions is identified/tagged as the anomalous data/pattern)

Furthermore, in an example based on the implementation of the features of the present invention a spike identified in return creation indicates return abuse and fraud, a spike identified in order creation indicates reseller behavior, dealer sabotage and RTO abuse etc., a spike identified in reviews creations indicates RnR abuse and a spike identified in account creation indicates new customer offer abuse.

Thus, the present invention provides a novel solution for automatically identifying one or more anomalous patterns in an input data stream to identify one or more digital frauds. The present invention provides a technical advancement over the known arts by overcoming the limitation of the prior known solutions related at least with the manual efforts to identify digital fraud(s). The present invention also provides a technical effect by providing a more efficient, effective and automatic digital fraud detection solution as compared to the prior known solutions. Also, the present invention provides the solution that detects frauds at much faster rate than existing methods and can be implemented without any previous knowledge of digital frauds.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

The invention claimed is:

1. A method for automatically identifying an anomalous pattern, the method comprising:
receiving, at an input unit [102], a stream of data;
determining, by a processing unit [104], a monitoring metric for at least one of one or more dimensions and one or more groups of dimensions associated with the stream of data, at a target time;
determining, by the processing unit [104], the monitoring metric for at least one of the one or more dimensions and the one or more groups of dimensions, at a benchmark time period;
identifying, by an identification unit [106], the monitoring metric for at least one of the one or more dimensions and the one or more groups of dimensions at the target time as an outlier to the monitoring metric for at least one of the one or more dimensions and the one or more groups of dimensions at the benchmark time period based at least on an event where the monitoring metric for at least one of the one or more dimensions and the one or more groups of dimensions at the target time is greater than the monitoring metric for at least one of the one or more dimensions and the one or more groups of dimensions at the benchmark time period at least by a threshold value; and
automatically identifying, by the identification unit [106], the anomalous pattern based at least on the identification of the monitoring metric for at least one of the one or more dimensions and the one or more groups of dimensions at the target time as the outlier to the monitoring metric for at least one of the one or more dimensions and the one or more groups of dimensions at the benchmark time period.

2. The method as claimed in claim 1, the method comprises determining by the processing unit [104] a dataset based on at least one cohort, wherein each cohort from the at least one cohort comprises one or more input dimensions.

3. The method as claimed in claim 2, wherein the monitoring metric is defined and monitored by the processing unit [104] based on the dataset.

4. The method as claimed in claim 3, wherein the one or more dimensions and the one or more groups of dimensions are identified based on the dataset.

5. The method as claimed in claim 1, the method further comprises determining, by the processing unit [104], a first ratio based on an iterative comparison of the monitoring metric for at least one of the one or more dimensions and the one or more groups of dimensions determined at the target time with an average of the monitoring metric for at least one of the one or more dimensions and the one or more groups of dimensions determined at the benchmark time period.

6. The method as claimed in claim 1, the method further comprises:
determining, by the processing unit [104], the monitoring metric for at least one of one dimension above the one or more dimensions associated with the stream of data and one dimension above the one or more groups of dimensions associated with the stream of data, at the target time;
determining, by the processing unit [104], the monitoring metric for at least one of the one dimension above the one or more dimensions associated with the stream of data and the one dimension above the one or more groups of dimensions associated with the stream of data, at the benchmark time period;
comparing iteratively, by the processing unit [104], the monitoring metric for at least one of the one dimension above the one or more dimensions associated with the stream of data and the one dimension above the one or more groups of dimensions associated with the stream of data at the target time with an average of the monitoring metric for at least one of the one dimension above the one or more dimensions associated with the stream of data and the one dimension above the one or more groups of dimensions associated with the stream of data at the benchmark time period; and
determining, by the processing unit [104], a second ratio based on said iterative comparison.

7. The method as claimed in claim 6, wherein automatically identifying, by the identification unit [106], the anomalous pattern is further based on a comparison of the first ratio and the second ratio.

8. The method as claimed in claim 2, the method comprises:
determining, by the processing unit [104], the monitoring metric for each vertical of the cohort at the target time;
determining, by the processing unit [104], the monitoring metric for the each vertical of the cohort at the benchmark time period;
comparing, by the processing unit [104], the monitoring metric for the each vertical of the cohort at the target time with an average of the monitoring metric for the each vertical of the cohort at the benchmark time period; and
determining, by the processing unit [104], a third ratio based on said comparison.

9. The method as claimed in claim 8, wherein automatically identifying, by the identification unit [106], the anomalous pattern is based on a comparison of the first ratio and the third ratio.

10. A system for automatically identifying an anomalous pattern, the system comprising:
an input unit [102], configured to receive, a stream of data;
a processing unit [104], configured to:
determine a monitoring metric for at least one of one or more dimensions and one or more groups of dimensions associated with the stream of data, at a target time; and
determine the monitoring metric for at least one of the one or more dimensions and the one or more groups of dimensions, at a benchmark time period; and
an identification unit [106], configured to:
identify the monitoring metric for at least one of the one or more dimensions and the one or more groups of dimensions at the target time as an outlier to the monitoring metric for at least one of the one or more dimensions and the one or more groups of dimensions at the benchmark time period based at least on an event where the monitoring metric for at least one of the one or more dimensions and the one or more groups of dimensions at the target time is greater than the monitoring metric for at least one of the one or more dimensions and the one or more groups of dimensions at the benchmark time period at least by a threshold value; and
automatically identify the anomalous pattern based at least on the identification of the monitoring metric for at least one of the one or more dimensions and the one or more groups of dimensions at the target time as the outlier to the monitoring metric for at least one of the one or more dimensions and the one or more groups of dimensions at the benchmark time period.

11. The system as claimed in claim 10, wherein the processing unit [104] is configured to determine a dataset based on at least one cohort, wherein each cohort from the at least one cohort comprises one or more input dimensions.

12. The system as claimed in claim 11, wherein the monitoring metric is defined and monitored by the processing unit [104] based on the dataset.

13. The system as claimed in claim 12, wherein the one or more dimensions and the one or more groups of dimensions are identified based on the dataset.

14. The system as claimed in claim 10, wherein the processing unit [104] is further configured to determine a first ratio based on an iterative comparison of the monitoring metric for at least one of the one or more dimensions and the one or more groups of dimensions determined at the target time with an average of the monitoring metric for at least one of the one or more dimensions and the one or more groups of dimensions determined at the benchmark time period.

15. The system as claimed in claim 10, wherein the processing unit [104] is further configured to:
   determine the monitoring metric for at least one of one dimension above the one or more dimensions associated with the stream of data and one dimension above the one or more groups of dimensions associated with the stream of data, at the target time;
   determine the monitoring metric for at least one of the one dimension above the one or more dimensions associated with the stream of data and the one dimension above the one or more groups of dimensions associated with the stream of data, at the benchmark time period;
   compare iteratively the monitoring metric for at least one of the one dimension above the one or more dimensions associated with the stream of data and the one dimension above the one or more groups of dimensions associated with the stream of data at the target time with an average of the monitoring metric for at least one of the one dimension above the one or more dimensions associated with the stream of data and the one dimension above the one or more groups of dimensions associated with the stream of data at the benchmark time period; and
   determine a second ratio based on said iterative comparison.

16. The system as claimed in claim 15, wherein the automatic identification of the anomalous pattern is further based on a comparison of the first ratio and the second ratio.

17. The system as claimed in claim 11, wherein the processing unit [104] is further configured to:
   determine the monitoring metric for each vertical of the cohort at the target time;
   determine, the monitoring metric for the each vertical of the cohort at the benchmark time period;
   compare the monitoring metric for the each vertical of the cohort at the target time with an average of the monitoring metric for the each vertical of the cohort at the benchmark time period; and
   determine a third ratio based on said comparison.

18. The system as claimed in claim 17, wherein the identification unit [106] is configured to automatically identify the anomalous pattern based on a comparison of the first ratio and the third ratio.

* * * * *